US011273716B2

(12) United States Patent
Matsuda et al.

(10) Patent No.: US 11,273,716 B2
(45) Date of Patent: Mar. 15, 2022

(54) ELECTRIC WORK VEHICLE

(71) Applicant: Kubota Corporation, Osaka (JP)

(72) Inventors: Kazuaki Matsuda, Sakai (JP); Hirokazu Ito, Sakai (JP); Masahiro Yamada, Sakai (JP); Tomohiko Hisakuni, Sakai (JP)

(73) Assignee: Kubota Corporation, Osaka (JP)

( * ) Notice: Subject to any disclaimer, the term of this patent is extended or adjusted under 35 U.S.C. 154(b) by 160 days.

(21) Appl. No.: 16/666,684

(22) Filed: Oct. 29, 2019

(65) Prior Publication Data

US 2020/0290465 A1    Sep. 17, 2020

(30) Foreign Application Priority Data

Mar. 12, 2019  (JP) ............................. JP2019-044974
Mar. 12, 2019  (JP) ............................. JP2019-044975

(51) Int. Cl.
*B60L 50/64* (2019.01)
*B60L 53/80* (2019.01)
*A01D 34/78* (2006.01)
*A01D 34/66* (2006.01)
*A01D 101/00* (2006.01)

(52) U.S. Cl.
CPC ............. *B60L 50/64* (2019.02); *A01D 34/78* (2013.01); *B60L 53/80* (2019.02); *A01D 34/66* (2013.01); *A01D 2101/00* (2013.01); *B60L 2200/40* (2013.01)

(58) Field of Classification Search
CPC ...... B60L 50/64; B60L 53/80; B60L 2200/40; A01D 34/78; A01D 34/66; A01D 2101/00
See application file for complete search history.

(56) References Cited

U.S. PATENT DOCUMENTS 3,690,397 A * 9/1972 Parker ..................... B60L 50/66
                                            180/65.6
6,139,247 A * 10/2000 Wright ..................... B60R 9/06
                                            224/519
9,693,501 B2 * 7/2017 Giere ..................... A01D 34/74
(Continued)

FOREIGN PATENT DOCUMENTS

JP        H0776228 A  *  3/1995  ............ H01M 50/20
JP        2018011574 A    1/2018
(Continued)

*Primary Examiner* — James A Shriver, II
*Assistant Examiner* — Michael T. Walsh
(74) *Attorney, Agent, or Firm* — The Webb Law Firm (57) ABSTRACT

An electric work vehicle includes a vehicle body having traveling wheels, a traveling motor capable of driving the traveling wheels, and a battery unit having, at one end portion thereof, a pair of left and right leg wheels, the battery unit being detachably attachable to a battery storage section of the vehicle body and being capable of supplying electric power to the traveling motor. The battery unit, when detached from the battery storage section, is posture-switchable between a flat placement state in which the leg wheels and the other end portion thereof opposite to the side on which the leg wheels are located are placed in contact with the ground surface and a tilted posture in which the battery unit can stand on its own with the other end portion thereof being located higher than the leg wheels.

10 Claims, 8 Drawing Sheets

(56) References Cited

U.S. PATENT DOCUMENTS

| | | | |
|---|---|---|---|
| 2010/0096605 A1* | 4/2010 | Fick | B66F 7/243 |
| | | | 254/88 |
| 2014/0102065 A1* | 4/2014 | Moriguchi | A01D 34/78 |
| | | | 56/10.7 |
| 2016/0242356 A1* | 8/2016 | Velderman | A01D 69/025 |
| 2017/0135283 A1* | 5/2017 | Ito | A01D 34/78 |
| 2018/0026244 A1 | 1/2018 | Ito et al. | |
| 2018/0338416 A1* | 11/2018 | Uemura | B60K 1/04 |
| 2019/0014718 A1* | 1/2019 | Uemura | A01D 34/66 |
| 2019/0075724 A1* | 3/2019 | Becke | A01D 69/02 |

FOREIGN PATENT DOCUMENTS

| | | | | |
|---|---|---|---|---|
| KR | 20170129065 A | * | 11/2017 | B60L 53/80 |
| WO | WO-2018168911 A1 | * | 9/2018 | A61G 5/04 |
| WO | WO-2018168914 A1 | * | 9/2018 | A61G 5/04 |

\* cited by examiner

ELECTRIC WORK VEHICLE

CROSS-REFERENCE TO RELATED APPLICATIONS

This application claims priority to Japanese Patent Application Nos. 2019-044974 and 2019-044975, both filed Mar. 12, 2019, the disclosures of which are hereby incorporated by reference in their entirety.

BACKGROUND OF THE INVENTION

Field of the Invention

For instance, an electric work vehicle disclosed in Japanese Unexamined Patent Application Publication No. 2018-11574 includes a battery unit and a battery storage section capable of storing the battery unit therein, the battery unit being detachably attachable to the battery storage section. While the battery unit has a capacity capable of supporting a grass cutting work for a long time, the unit has such a significant weight which makes it difficult for a worker to carry it by holding it with hands. For this reason, in order to allow a worker to carry the battery unit easily, the battery unit is provided with a leg wheel. When the battery unit is to be attached to or detached from the battery storage section, the battery unit can be pivoted about the leg wheel. Incidentally, when e.g. a worker is to carry out a maintenance operation of a vehicle body or a traveling wheel, the worker may jack (lift) up the vehicle body with using a jack. Such maintenance operation may need to be carried out unexpectedly due to a factor such as a trouble, in the course of a utility work being carried out by the electric work machine. In such case, even if a jack is not readily available on the site, it is still desired that the maintenance operation be carried out appropriately on the site. In view of the above-described state of the art, an object of the present invention is to provide an electric work vehicle that allows a maintenance operation of the vehicle with a simple arrangement.

Incidentally, in the case of the electric work vehicle illustrated in Japanese Unexamined Patent Application Publication No. 2018-11574, in addition to the battery unit attached already in the battery storage section, a battery unit for replacement (a replacement battery unit) may be prepared. And, it is assumed that such battery unit for replacement will be transported together with the electric work vehicle by a truck and when the electric work vehicle is lowered onto the ground from a load carrier deck of the truck with using a slope, the replacement battery unit too will be lowered from the load carrier deck of the truck. In this case, although the electric work vehicle can be self-propelled, respecting the replacement battery unit, this replacement unit, though heavy, needs to be lowered by the worker with rolling of the leg wheel. For this reason, if the truck is not equipped with a lift system such as a lift gate, the lowering operation of the battery unit is a hard labor for the worker. In view of the above-described state of the art, another object of the present invention is to provide an electric work vehicle that allows easy unloading of a battery relative to a truck or the like.

SUMMARY OF THE INVENTION

An electric work vehicle according to the present invention comprises:
a vehicle body having traveling wheels;
a traveling motor capable of driving the traveling wheels;
a battery unit having, at one end portion thereof, a pair of left and right leg wheels, the battery unit being detachably attachable to a battery storage section of the vehicle body and being capable of supplying electric power to the traveling motor;
a lift-up member provided at an area of the other end portion opposite to the side on which the leg wheels are located in the battery unit and capable of lifting up one end side of the vehicle body;
wherein the battery unit, when detached from the battery storage section, is posture-switchable between a flat placement state in which the leg wheels and the other end portion thereof are placed in contact with the ground surface and a tilted posture in which the battery unit can stand on its own with the other end portion thereof being located higher than the leg wheels.

With the present invention described above, a battery unit is used as a "jack" capable of lifting (jacking) up the vehicle body. And, the battery unit is provided with a lift-up member. As the battery unit is pivoted to a tilted state, the other end portion of the battery unit is lifted up together with the lift-up member. With this arrangement, even when a worker needs to carry out an unexpected maintenance operation of the electric work vehicle due to such factor as a trouble, the worker can detach the battery from the battery storage section and use the battery unit as a jack. Thus, there is realized an electric work vehicle that allows a maintenance operation of the vehicle with a simple arrangement.

Incidentally, what is referred to as "leg wheel" in the present invention includes both a caster wheel supported to a swivel frame to be turnable and a non-turnable fixed caster wheel.

Preferably, in the above-described arrangement, the electric work vehicle further comprises:
a pair of left and right guide rails provided in left and right respective side walls of the battery storage section and extending in a front/rear direction and capable of guiding the battery unit to the battery storage section;
wherein the lift-up member comprises a pair of left and right guide rollers that can roll along the guide rails.

With the above-described arrangement, the pair of left and right guide rollers act both as roller members that can roll along the pair of left and right guide rails and as the lift-up member capable of lifting up the vehicle body. Thus, in comparison with an arrangement in which such roller members and the lift-up member are provided as separate entities, the number of components is reduced, thus being cost-advantageous.

Preferably, in the above-described arrangement, the electric work vehicle further comprises:
a pair of left and right front wheels included in the traveling wheels and configured as caster type driven wheels;
a pair of left and right front wheel support portions provided at front portions of the vehicle body and capable of pivoting the pair of left and right front wheels respectively along a vertically oriented axis; and
engaging portions provided in the pair of left and right front wheel support portions and engageable with the lift-up member.

The front wheel support portions support the front wheels placed in contact with the ground surface, so these front wheel support portions are often configured to extend in the vertical direction. With the above-described arrangement, since the front wheel support portion is provided with an engaging portion, matching of the vertical position of the engaging portion with the vertical position of the lift-up member can be easily made. Thus, the lift-up operation of the vehicle body can be effected more easily.

Preferably, in the above-described arrangement, the electric work vehicle further comprises:

a handle provided at an upper portion of the battery unit and capable of switching the posture of the battery unit between the flat placement state and the tilted state.

With the above-described arrangement, as the worker operates the handle, a leverage force is applied to the handle. Thus, the worker can easily effect a posture switching of the battery unit between the flat placement state and the tilted state.

Preferably, in the above-described arrangement, the electric work vehicle further comprises:

stays provided in the battery unit and disposed in the periphery of the pair of left and right leg wheel, the stays allowing inserting of holder tools therethrough;

wherein the battery unit is maintained under the tilted posture, with the holder tools being inserted in the stays.

With the above-described arrangement, under the tilted state of the battery unit, the leg wheels can be restrained, and the tilted state of the battery unit can be maintained stably.

An electric work vehicle according to the present invention comprises:

a vehicle body having traveling wheels;

a traveling motor capable of driving the traveling wheels;

a battery unit having, at one end portion thereof, a pair of left and right leg wheels, the battery unit being detachably attachable to a battery storage section of the vehicle body and capable of supplying electric power to the traveling motor; and a towing portion capable of towing the battery unit not attached to the battery storage section.

With the present invention described above, the electric work vehicle is provided with a towing portion capable of towing a battery unit. Since the electric work vehicle can be self-propelled by the traveling motor, when a replacement battery unit is connected to the towing portion, this replacement battery unit will be towed by the electric work vehicle. Therefore, in the case of loading or unloading the replacement battery unit onto or from e.g. a load carrier deck of a truck, even if this operation is carried out via a slope as the truck has no lifting device such as a lift gate, the loading/unloading operation of the battery unit is effected by towing of the electric work vehicle. With this, there is realized an electric work vehicle that allows easy unloading of a battery relative to a truck or the like, even if the battery is not attached to the battery storage section. Incidentally, it is understood that the language "towing" as used in the present invention is meant to be inclusive of not only pulling of an object, but also of advancing by pushing of an object.

Preferably, in the above-described inventive arrangement:

the battery storage section is provided at a rear portion of the vehicle body; and the towing portion is provided at a front portion of the vehicle body.

With the above-described arrangement, since the towing portion is provided at a front portion of the vehicle body, a driver or a passenger riding on the electric work vehicle can operate the electric work vehicle while visually monitoring the towing portion disposed in front.

Preferably, in the above-described inventive arrangement, the electric work vehicle further comprises:

a handle provided at an upper portion of the battery unit and capable of towing the battery unit;

wherein the towing portion and the handle are engageable with each other.

With the above-described arrangement, the handle of the battery unit is used as an "engaging member" to be engaged with the towing portion. The handle may be configured, e.g. to tow the battery unit on a flat land by a manual operation. With this arrangement, it is possible to configure the handle both as a towing tool by a manual operation and a towing tool by the electric work vehicle.

DETAILED DESCRIPTION OF THE PREFERRED EMBODIMENTS

[Basic Configuration of Electric Work Vehicle]

An embodiment of an electric work vehicle relating to the present invention will be explained. In this detailed description, unless indicated otherwise, the word "front" ("FORWARD" in FIGS.) means the front side relative to the vehicle body front/rear direction (traveling direction), and the word "rear" ("REVERSE" in FIGS.) means the rear side relative to the vehicle body front/rear direction (traveling direction). Further, the left/right direction or the lateral direction means the vehicle body transverse direction (vehicle body width direction) perpendicular to the vehicle body front/rear direction. The word "upper" ("UP" in FIGS.) or "lower" ("DOWN" in FIGS.) refers to the positional relation in the perpendicular direction (vertical direction) of the vehicle body, referring to the positional relation respecting the ground clearance. Moreover, the language "rider" or "worker" as used in the present embodiment can refer to a same person. In addition, the language "towing" as used in the present embodiment is inclusive of not only pulling of an object, but also of propelling of an object by pushing.

Figure 1:
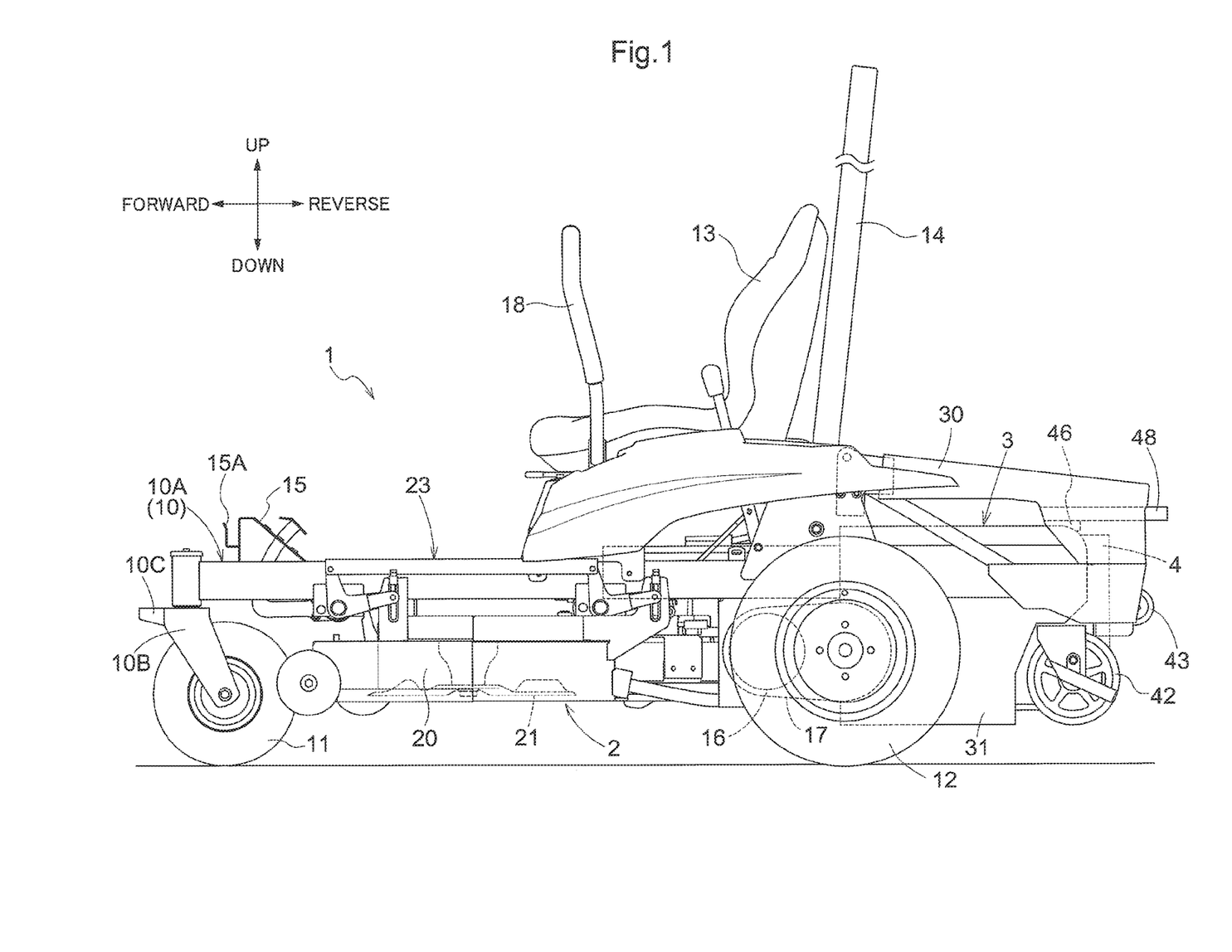
FIG. 1 is a left side view of an electric grass mower machine.
Figure 2:
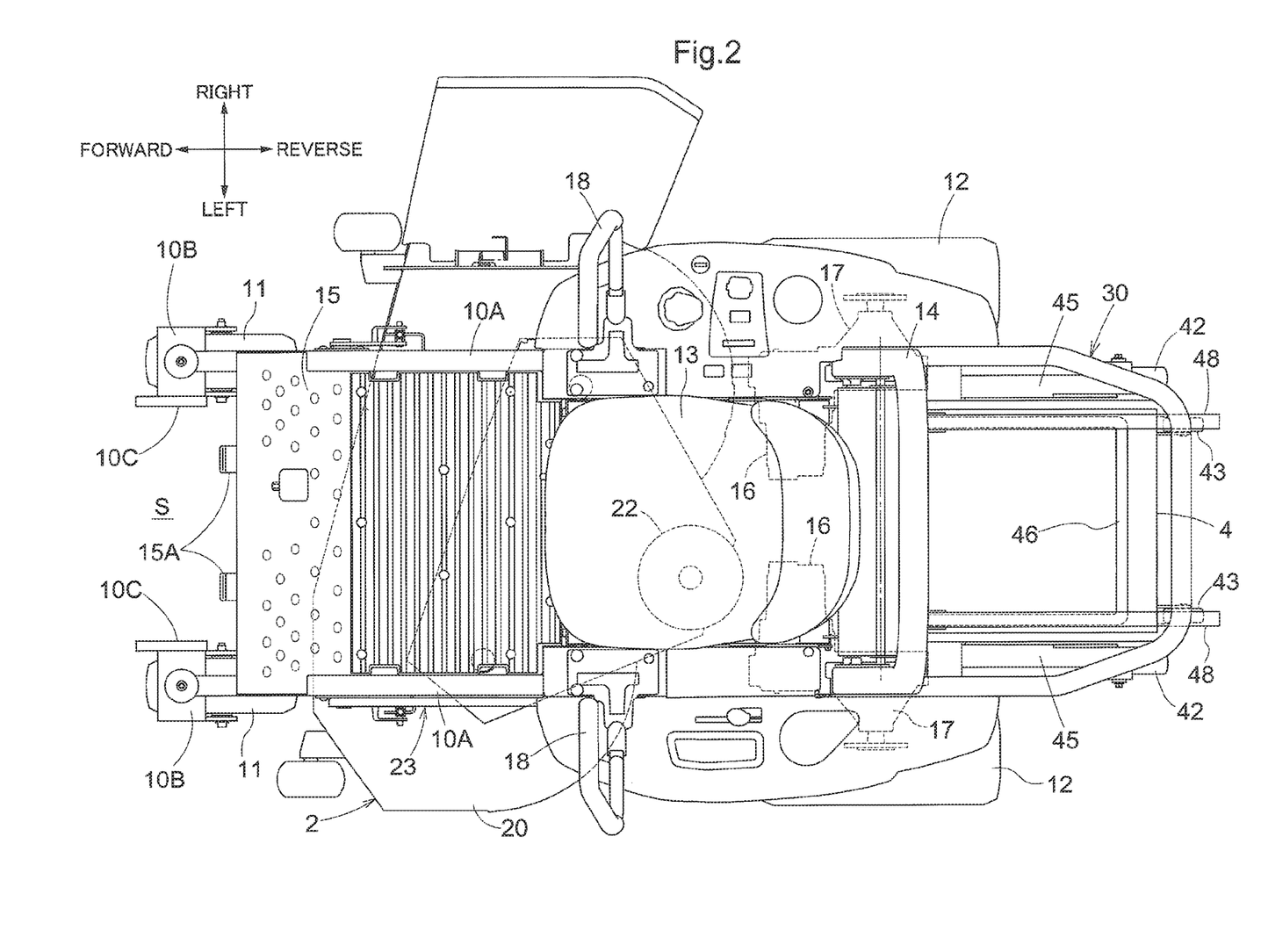
FIG. 2 is a plan view of the electric grass mower machine.

FIG. 1 and FIG. 2 show an electric grass mower machine as an example of the electric work vehicle. In this electric grass mower machine, there are provided a vehicle body 1, a pair of left and right freely rotatable caster type front wheels 11, a pair of left and right rear wheels 12, a mower unit 2 and a battery storage section 3. The pair of left and right front wheels 11 are provided at front portions of the vehicle body 1 and the pair of left and right rear wheels 12 are provided at rear portions of the vehicle body 1. Here, the language "traveling wheels" refer to the pair of left and right front wheels 11 and the pair of left and right rear wheels 12. The mower unit 2 is supported under the vehicle body 1 and between the pair of left and right front wheels 11 and the pair of left and right rear wheels 12 in the front/rear direction and the right/left direction. The battery storage section 3 is supported at a rear portion of the vehicle body 1 between the pair of left and right rear wheels 12.

The vehicle body 1 includes a frame 10. This frame 10 includes a pair of left and right front/rear beams 10A and an unillustrated cross beam. These front/rear beams 10A extend in the front/rear direction and are connected to each other via the cross beam. Under the front-end portion of the respective left and right front/rear beam 10A, the front wheel 11 is supported via a front wheel support portion 10B. The pair of left and right front wheel support portions 10B are pivotable about a vertically oriented axis, so that the pair of left and right front wheels 11 can be pivoted about the vertically oriented axis. Namely, of the traveling wheels, the pair of left and right rear wheels 12 are drive wheels and the pair of left and right front wheels 11 are caster type driven wheels.

At upper portions of the vehicle body 1, there are provided a driver's seat 13, a ROPS frame 14, etc. The driver's seat 13 is supported to the frame 10 and the lower portion of the ROPS frame 14 is connected to the frame 10. In the vehicle body 1, on more front side than the driver's seat 13, a floor plate 15 is formed. This floor plate 15 serves as a footrest for a riding person. The front-end portion of the floor plate 15 is located on more vehicle body rear side than the front-end portion of the respective left/right front/rear beam 10A.

At rear portions of the vehicle body 1, there are disposed a pair of left and right traveling motors 16 and a pair of left and right speed reduction mechanisms 17. Power of the traveling motor 16 on the vehicle body right side is transmitted to the rear wheel 12 on the vehicle body right side via the vehicle body right side speed reduction mechanism 17. Further, power of the traveling motor 16 on the vehicle body left side is transmitted to the rear wheel 12 on the vehicle body left side via the vehicle body left side speed reduction mechanism 17. Namely, the left and right rear wheels 12 are driven independently of each other.

On the left and right opposed sides of the driver's seat 13, there are disposed a pair of left and right speed changer levers 18. If the riding person operates the vehicle body right side speed changer lever 18 to its neutral position, the vehicle body right side traveling motor 16 is stopped. If the riding person operates the vehicle body right side speed changer lever 18 to its forward traveling side, the vehicle body right side traveling motor 16 is rotated to the forward traveling side. If the riding person operates the vehicle body right side speed changer lever 18 to its reverse traveling side, the vehicle body right side traveling motor 16 is rotated to the reverse traveling side. Further, if the riding person operates the vehicle body left side speed changer lever 18 to its neutral position, its forward traveling side, or the reverse traveling side, the vehicle body left side traveling motor 16 will be operated similarly as described above. With these, the traveling motors 16 can drive the rear wheels 12 as the traveling wheels. Namely, as the riding person operates the left and right speed changer levers 18 independently, the left and right rear wheels 12 are driven independently. As a result, traveling and turning of the electric grass mower machine are made possible.

The mower unit 2 includes a housing unit 20, a cutter blade 21, a cutter blade motor 22 and a link mechanism 23. The lower portion of the housing unit 20 is opened toward the lower side, and the cutter blade 21 and the cutter blade motor 22 are housed in the housing unit 20. Therefore, the front and rear sides and left and right sides of the cutter blade 21 and the upper side of the cutter blade 21 are covered by the housing unit 20. The cutter blade 21 is rotatable by power of the cutter blade motor 22 about a vertical axis inside the housing unit 20. The housing unit 20 is pivotally suspended from the frame 10 by the link mechanism 23.

As described above, the battery storage section 3 is provided at a rear portion of the vehicle body 1 and this battery storage section 3 is capable of storing the battery unit 4 therein. The battery unit 4 can supply electric power to the traveling motor 16 and the cutter blade motor 22. The battery storage section 3 is provided with a rear portion cover 30, which is vertically pivotable about an axis oriented in the vehicle body transverse direction at a front portion of the battery storage section 3. With this, the upper portion of the battery storage section 3 is covered by the rear portion cover 30.

As shown in FIGS. 3 through 6, the battery storage section 3 includes a pair of left and right side walls 31, a front wall 32 and a floor plate 33. The left and right side walls 31 are fixed to the rear portion of the frame 10. The left and right side walls 31 have their respective front-ends connected to the front wall 32. Further, the respective lower ends of the side walls 31 and the lower end of the front wall 32 are connected to the floor plate 33 which is disposed horizontal. To the left and right respective side walls 31, guide rails 34 and auxiliary rollers 35 are fixed. Each one of the pair of left and right guide rails 34 has a channel-like cross section and extends in the front/rear direction and can guide the battery unit 4 to the battery storage section 3. The auxiliary roller 35 is rotatably provided at a position slightly rearwardly of the rear-end of the guide rail 34. Adjacent the front-end of the guide rail 34, inside the channel, there is provided a stopper 36 formed of elastic body such as a spring, rubber, etc.

[Arrangement of Battery Unit]

As shown in FIGS. 3 through 6, in the instant embodiment, downwardly of the battery unit 4, there is provided a cart-like carrier 40. Though not detailed, the carrier 40 is constituted of assembly of a plurality of frames and the main body of the battery is placed and supported on the carrier 40. With the above arrangement, the battery unit 4 can be transported by the carrier 40 without need for other load carrier deck or the like.

At the right end portion and the left end portion respectively of a front lower portion of the carrier 40, a shoe 41 is attached under a downward orientation. At rear lower portions of the carrier 40, there are provided right and left large-diameter leg wheels 42 for moving via brackets. Namely, the battery unit 4 includes, at one end portion thereof, the large-diameter leg wheels 42 as a pair of leg wheels.

Figure 3:
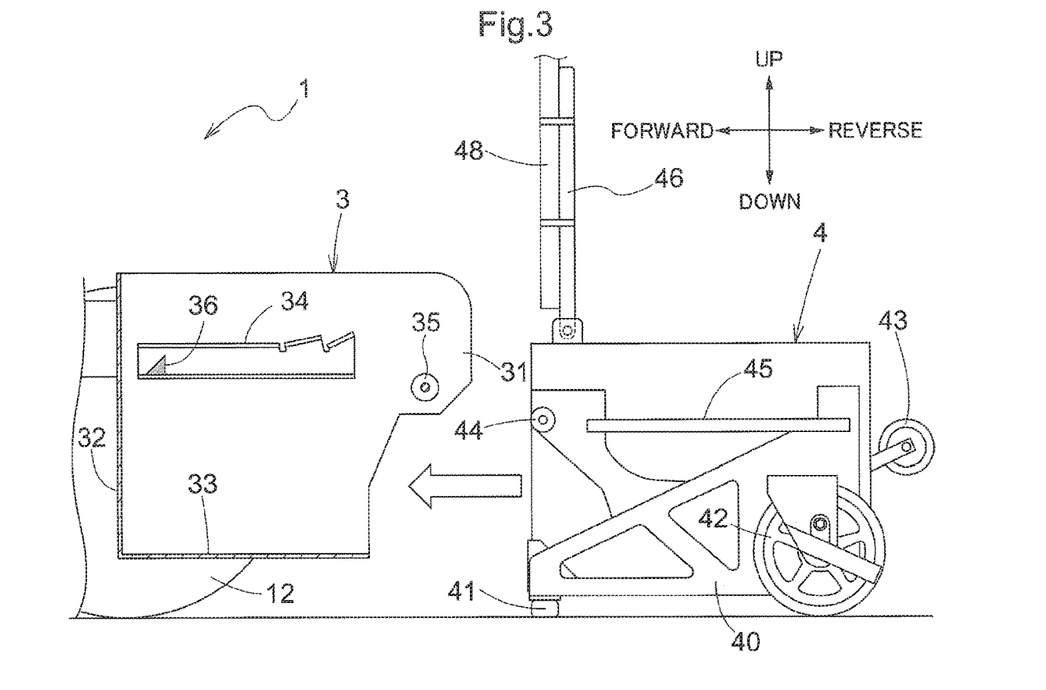
FIG. 3 is a side view illustrating a process of how a battery unit is to be attached to a battery storage section.
Figure 4:
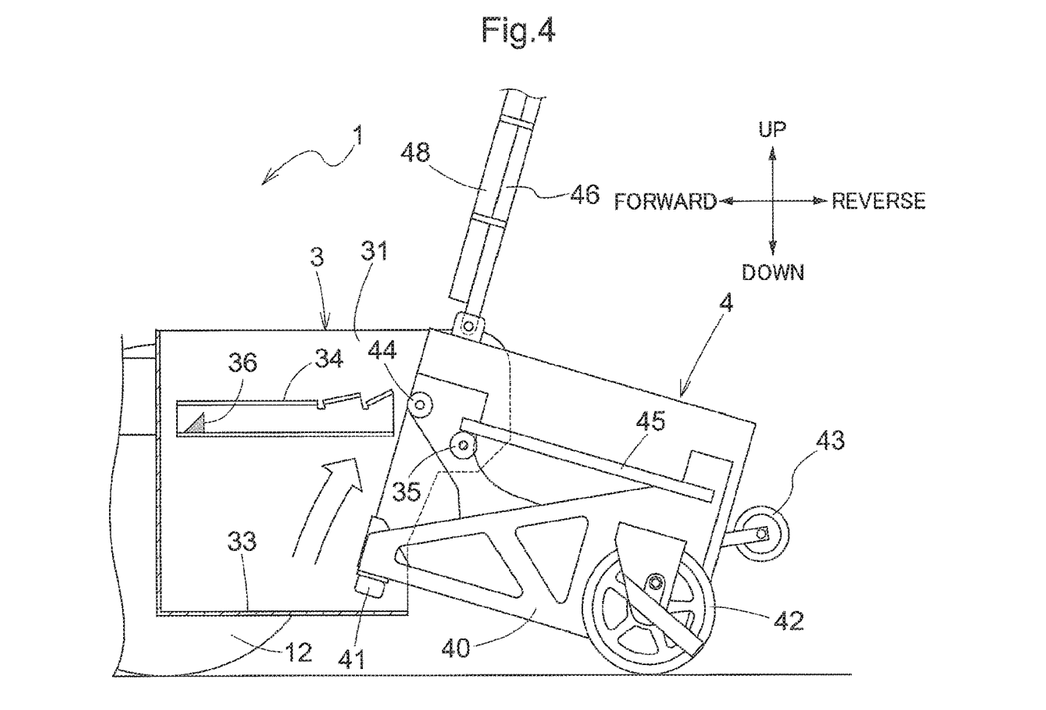
FIG. 4 is a side view illustrating the process of how the battery unit is to be attached to the battery storage section.

As shown in FIG. 3, when detached from the battery storage section 3, the large-diameter leg wheels 42 as the leg wheels and the shoes 41 as the other end portion opposite to the position of the large-diameter leg wheels 42 are placed in contact with the ground surface. This state is referred to herein as a "flat placement state". As the shoes 41 and the large-diameter leg wheels 42 are placed on the ground surface, the battery unit 4 can stand on its own. And, as shown in FIG. 4, when the shoes 41 are lifted up afloat, the battery unit 4 can be smoothly moved via the large-diameter leg wheels 42. The battery unit 4 can stand on its own when it is pivoted about the axes of the large-diameter leg wheels 42, so that the shoes 41 as the other end portion are located higher than the large-diameter leg wheels 42 (see FIG. 10). This state is referred to herein as a "tilted state". To the side portions at the rear-end of the carrier 40, small-diameter leg wheels 43 are rotatably provided. When the large-diameter leg wheels 42 and the small-diameter leg wheels 43 are placed on the ground surface, the tilted state of the battery unit 4 is maintained and the battery unit 4 can movably stand on its own. In this way, the battery unit 4, when detached from the battery storage section 3, can be posture-switchable between the flat placement state and the tilted state.

At left and right respective side portions of the front portion of the carrier 40, guide rollers 44 are rotatably attached. Further, rearwardly of the guide rollers 44, guide rods 45 are provided, the guide rods 45 extends in the front/rear direction on the left and left respective side portions of the carrier 40.

At a front upper end portion of the battery unit 4, a handle 46 is provided. The handle 46 extends upwards from the upper end portion of the battery unit 4. As a worker or the like grasps and pulls the handle 46, the battery unit 4 can be towed. Though not detailed herein, the handle 46 is configured to be pivotable about a horizontal axis at the upper end portion of the battery unit 4 and can maintain its pivotal angle relative to the battery unit 4 at a set angle by an unillustrated lock mechanism. Incidentally, this set angle is not limited to one angle, but can be adjusted to a plurality of angles. Further, the length from the pivotal base end portion to the free end portion of the handle 46 is adjustable as desired.

FIGS. 3 through 6 illustrate a process of loading the battery unit 4 in the battery storage section 3. FIG. 3 shows a state before starting of the loading, in which the battery unit 4 is located rearwardly of the vehicle body 1. The rear portion cover 30 is pivoted upwards and the rear side and the upper side of the battery storage section 3 are opened. And, as shown in FIG. 4, the battery unit 4 will be moved closer to the battery storage section 3 and the battery unit 4 will be moved under its tilted state, so that the guide rods 45 of the battery unit 4 will be placed on the auxiliary rollers 35 of the battery storage section 3 and the shoes 41 will ride onto the floor plate 33.

Figure 5:
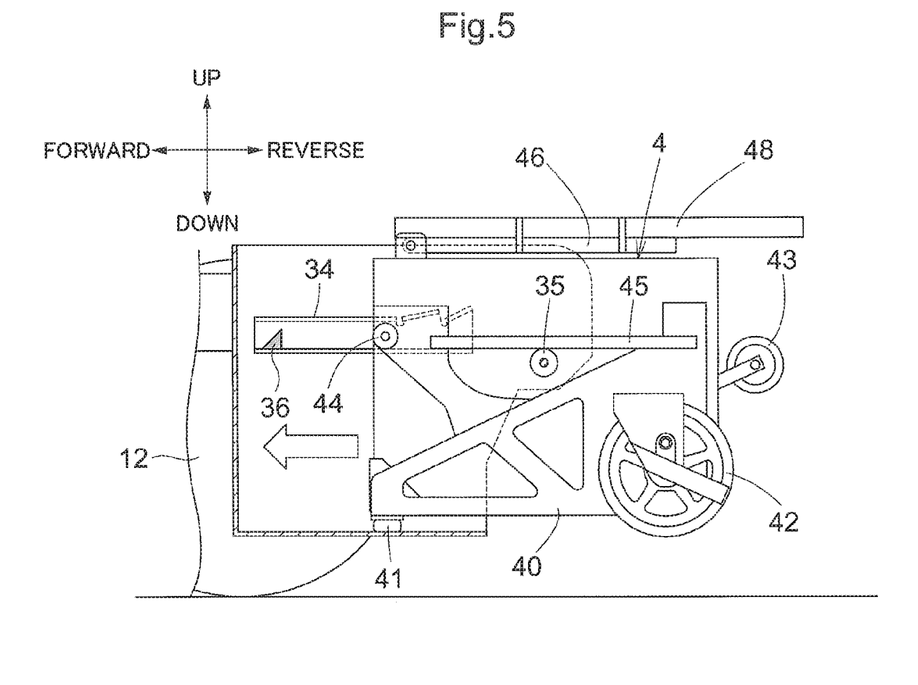
FIG. 5 is a side view illustrating the process of how the battery unit is to be attached to the battery storage section.
Figure 6:
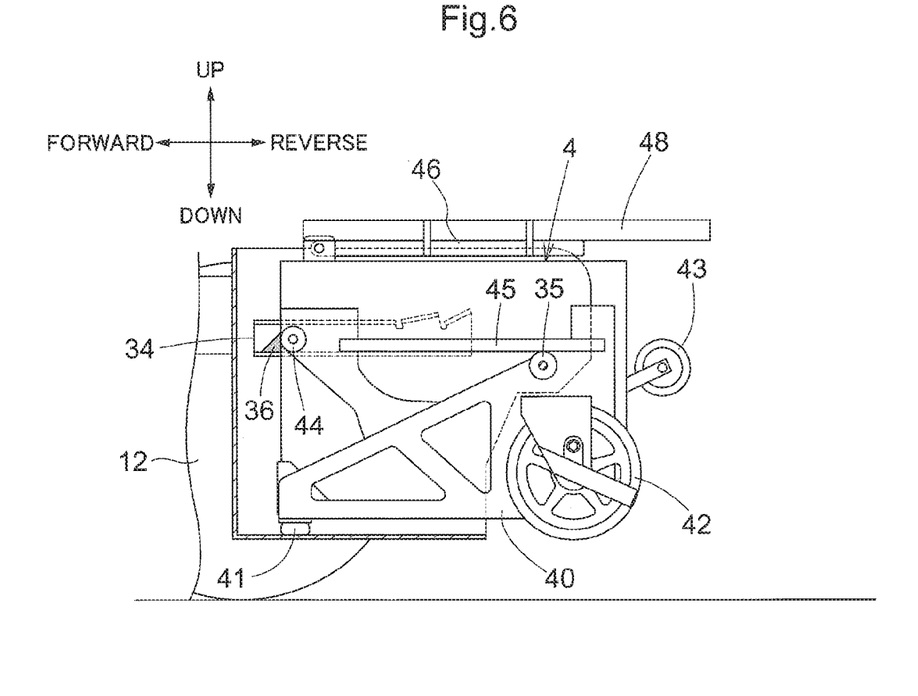
FIG. 6 is a side view illustrating a state in which the battery unit has been attached to the battery storage section.

As shown in FIG. 4 and FIG. 5, the worker will move the battery unit 4 to the vehicle body front side while returning the battery unit 4 to the horizontal posture and advance the battery unit 4 inside the guide rails 34 of the battery storage section 3. In this, due to the guide rollers 44 rolling on the guide rails 34 and the auxiliary rollers 35 supporting the guide rods 45 with rolling under the guide rods 45, the battery unit 4, under its horizontal posture, can smoothly move to the vehicle body front side. And, as shown in FIG. 6, as the guide rollers 44 and the stoppers 36 come into contact with each other, movement of the battery unit 4 to the machine body front side is restricted. As described above, the battery unit 4 includes, at one end portion thereof, the large-diameter leg wheels 42 as a pair of left and right leg wheels and can be detachably attached to the battery storage section 3 of the vehicle body 1. When the battery unit 4 is stored in the battery storage section 3, the battery unit 4 can supply electric power to the traveling motor 16.

[Battery Unit as Jack]

Figure 7:
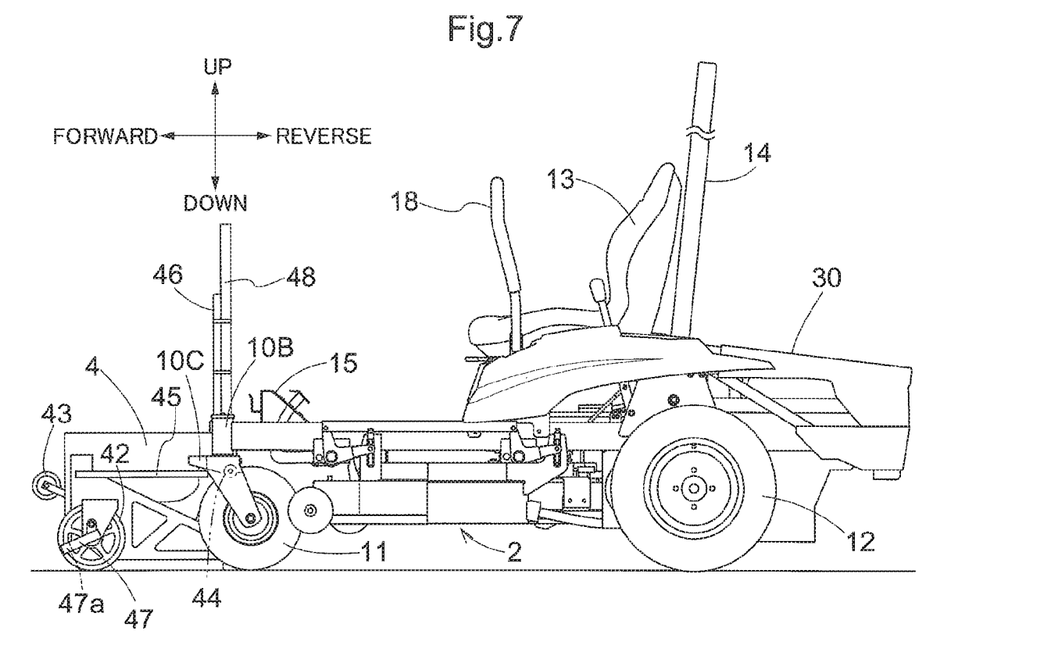
FIG. 7 is a side view showing a state in which the battery unit is located on the front side of the vehicle body.
Figure 8:
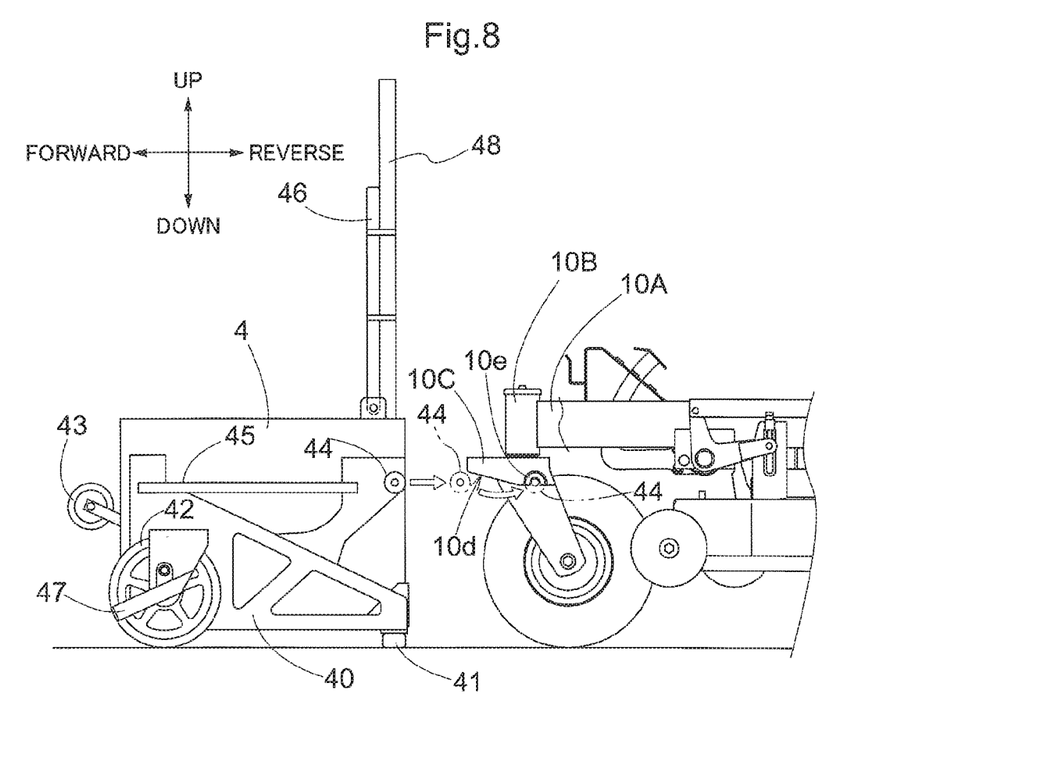
FIG. 8 is a side view illustrating a process of how the battery unit is to lift up a vehicle body.
Figure 9:
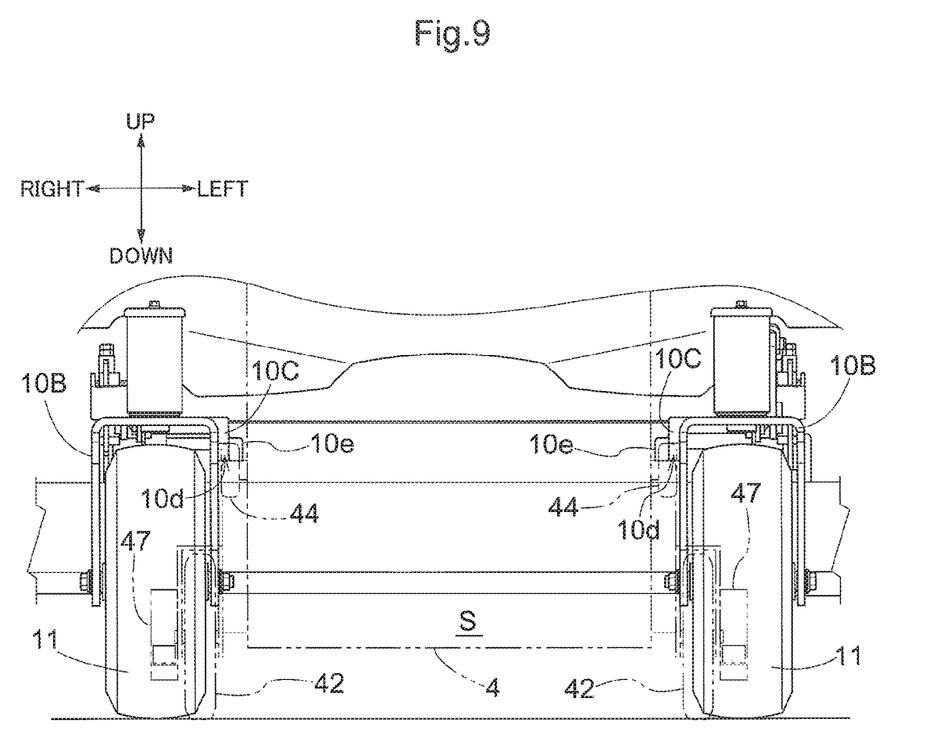
FIG. 9 is a front view showing relation between a front portion of the vehicle body and the battery unit.

As shown in FIGS. 7 through 10, the battery unit 4 can be utilized as a "jack" for jacking up the front portion of the vehicle body 1. As shown in FIG. 9, the width of the battery unit 4 in the left/right direction is set smaller than the distance between vehicle body inner side end portions of the left and right front/rear beams 10A. With this arrangement, either the front or rear-end portion of the battery unit 4 can enter a space S (see FIG. 2) surrounded by the area of the front-end portions of the pair of left and right front/rear beams 10A and the front-end portion of the floor plate 15.

At side portions of the machine body inner sides of the left and right front wheels 11, connecting stays 10C are provided. The connecting stays 10C are formed integral with the front wheel support portions 10B. At the front portion of each connecting stay 10C, an inclined face 10d oriented downwards is formed, the inclined face 10d being inclined more forwardly upwards on the forward traveling side. At a rear portion of the connecting stay 10C, there is formed a semi-circular recess 10e. The arcuate shape of the inside diameter of the recess 10e is identical or nearly identical to the arcuate shape of the outside diameter of the guide roller 44, so that the upper half of the guide roller 44 can enter the recess 10e. In the front/rear direction, the arcuate-shaped face of the recess 10e is tilted in the upper direction from the rear-end side of the inclined face 10d.

FIGS. 7 through 10 illustrate a process of the battery unit 4 jacking up the front portion of the vehicle body. As shown in FIG. 7, the battery unit 4 will be placed in front of the vehicle body 1 in such a manner that the large-diameter leg wheels 42 are positioned on the front side. Namely, in this case, the front/rear orientation of the battery unit 4 is reversed relative to that of the case of it being stored in the battery storage section 3. Then, a worker or the like will hold the handle 46 to move the battery unit 4 to the rear side to cause the end of the battery unit 4 on the disposing side of the guide rollers 44 to advance into the space S (see FIG. 2).

As shown in FIG. 9, as seen in the machine body front/rear direction, the spacing between the pair of left and right guide rollers 44 is identical or substantially identical to the spacing between the pair of left and right connecting stays 10C. As shown in FIG. 8, when the battery unit 4 is pushed further rearwards by the worker or the like with the end portion of the battery unit 4 on the disposing side of the guide rollers 44 being advanced into the space S, the left and right respective guide rollers 44 and the left and right respective connecting stays 10C come into contact with each other. And, as the guide rollers 44 roll to the rear side along the inclined face 10d, the upper half portions of the guide rollers 44 will enter the recesses 10e. With this, engagement is established between the pair of left and right guide rollers 44 and the pair of left and right connecting stays 10C.

Namely, in the area of the other end portion of the battery unit 4 opposite to the disposing side of the large-diameter leg wheels 42, there is provided a "lift-up member" capable of lifting (jacking) up one end side of the vehicle body. And, this lift-up member is constituted of the pair of left and right guide rollers 44 that can roll along the guide rails 34. And, in the pair of left and right front wheel support portions 10B, there are provided the pair of left and right connecting stays 10C and the recesses 10e which together function as an "engaging portion" engageable with the lift-up member.

Figure 10:
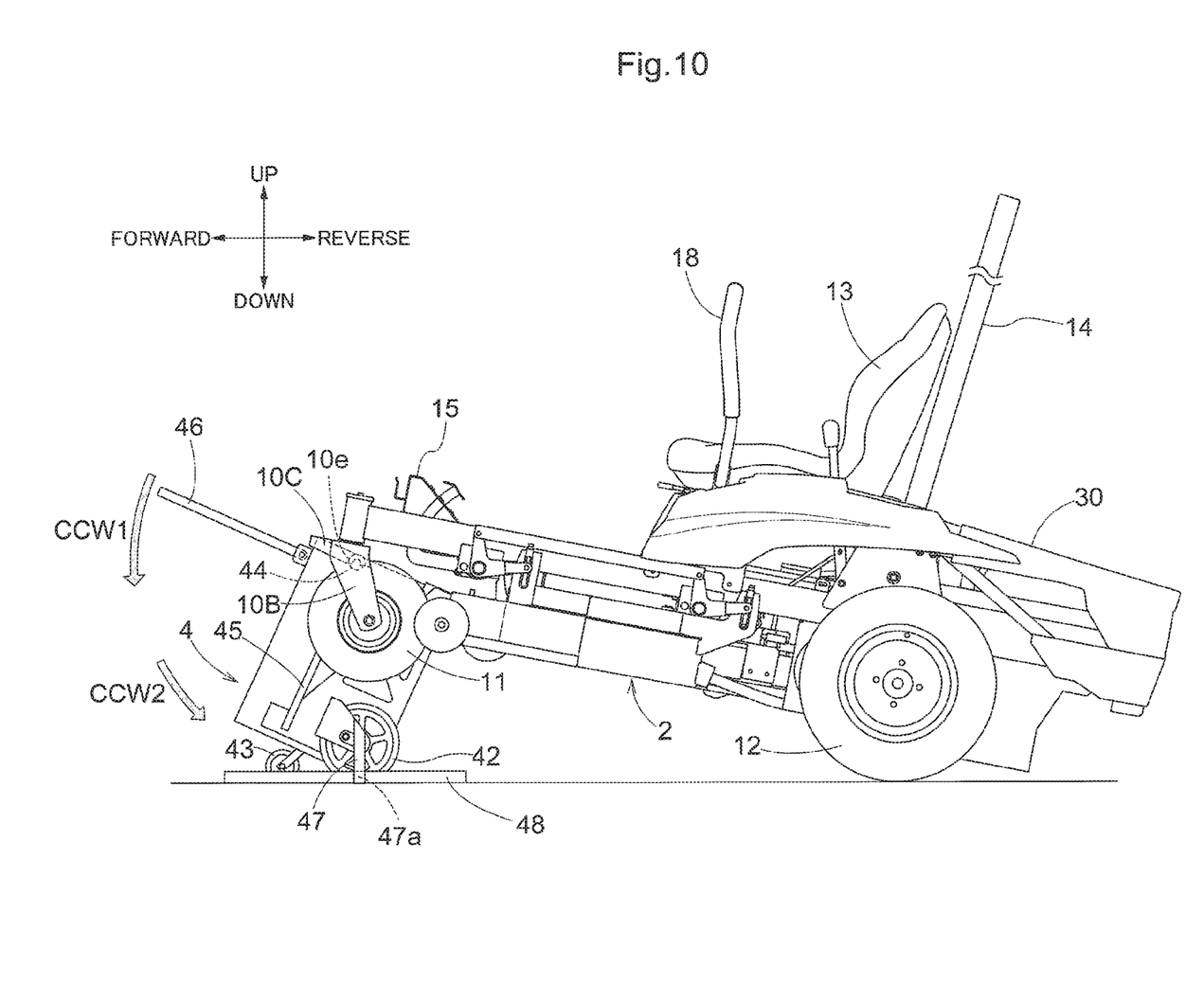
FIG. 10 is a side view showing a state in which the battery unit has lifted up the vehicle body.

Next, as shown in FIG. 10, when the worker or the like applies a leverage force CCW1 in the machine body front direction to the handle 46, with this leverage force CCW1, the entire battery unit 4 is pivoted counter-clockwise in the plane of FIG. 10. Further, as shown in FIG. 10, alternatively, the worker or the like may apply a leverage force CCW2 in the machine body rear direction to the end portion of the battery unit 4 on the disposing side of the large-diameter leg wheels 42. In this case, due to the leverage force CCW1 and the leverage force CCW2, the entire battery unit 4 will be pivoted counterclockwise in the plane of FIG. 10. As described above, the handle 46 provided upwardly of the battery unit 4 can effect the posture switchover operation of the battery unit 4 to the flat placement state and to the tilted state.

When the battery unit 4 is pivoted as described above, the pair of left and right large-diameter leg wheels 42 will roll to the rear side along the ground surface. Further, the engaged condition between the pair of left and right guide rollers 44 and the pair of left and right connecting stays 10C is maintained. Therefore, in association with rolling of the pair of left and right large-diameter leg wheels 42, the portions of the pair of left and right guide rollers 44 will be lifted up. Namely, with the portions of the battery unit 4 where the large-diameter leg wheels 42 are located on the front side, the portions of the battery unit 4 more rearwards than the large-diameter leg wheels 42 will be tilted rearwardly upwards. Further, in other words, with the portions of the battery unit 4 where the large-diameter leg wheels 42 are located on the front side, the portions of the battery unit 4 upwardly of the large-diameter leg wheels 42 will be tilted forwardly upwards. And, when the small-diameter leg wheels 43 disposed on the front side of the machine body come into contact with the ground surface, the pivoting of the battery unit 4 is stopped, whereby the front portion of the vehicle body 1 is lifted (jacked) up by the battery unit 4.

From one left or right side or both sides of the carrier 40, a stay(s) 47 extends. When the shoes 41 and the large-diameter leg wheels 42 are placed in contact with the ground surface, the stay 47 is tilted rearwardly downwards and as seen in a side view, the stay 47 and the large-diameter leg wheels 42 are overlapped with each other. The stay 47 is disposed on more laterally outer side (the near side in the plane of FIG. 1) than the large-diameter leg wheels 42.

When the pair of left and right large-diameter leg wheels 42 and the small-diameter leg wheels 43 are placed in contact with the ground surface, the lifted-up state of the vehicle body 1 is maintained. In this, the stay 47 extends along the vertical direction, and at the lower end portion of the stay 47, there is formed a through hole 47a, into which a holder tool 48 is inserted. In this embodiment, the holder tool 48 is provided as an approximately straight bar. When the holder tool 48 is inserted in the through hole 47a, this holder tool 48, as extending in the front/rear direction, comes into contact with the ground surface. The holder tool 48 is not pivotable relative to the stay 47. As the holder tool 48 is placed in contact with the ground surface, the pair of left and right large-diameter leg wheels 42 and the small-diameter leg wheels 43 do not roll on the ground surface, so that the position of the battery unit 4 is maintained.

As shown in FIG. 10, when the battery unit 4 is tilted to lift up the front portion of the vehicle body 1, the longitudinal length of the holder tool 48 is the length extending between the front-end and the rear-end of the battery unit 4. For this reason, even when a pressing force is applied to the battery unit 4 in the front/rear direction for instance, as the holder tool 48 is inserted in the through hole 47a of the stay 47, such pressing force in the front/rear direction is received by the stay 47, so the tilted state of the battery unit 4 is maintained with the holder tool 48 being inserted in the through hole 47a of the stay 47, so the battery unit 4 will not move and the lifted-up state of the front portion of the vehicle body 1 is maintained.

As described above, the front portion of the vehicle body 1 is lifted (jacked) up by tilting of the battery unit 4 and this tilted state of the battery unit 4 is maintained by the holder tool 48. Therefore, the battery unit 4 realizes a jacking arrangement that does not require much labor by a worker or the like and that also can provide stable support.

When the worker or the like is to release the lift-up state of the vehicle body 1, firstly, the worker or the like will remove the holder tool 48 out of the through hole 47a and then, the worker or the like will apply to the handle 46 a force on the opposite side to the leverage force CCW1, whereby the battery unit 4 as a whole will be pivoted clockwise in the plane of FIG. 10. In association therewith, the pair of left and right large-diameter leg wheels 42 will roll to the machine body front side and the portions of the pair of left and right guide rollers 44 will fall, whereby the lift-up state of the front portion of the vehicle body 1 is released.

When removed from the through hole 47a, the holder tool 48 can be stored by being fixed to a portion of the battery unit 4. For instance, the holder tool 48 may be attached to the handle 46, or the holder tool 48 may be attached to the carrier 40. Further alternatively, the holder tool 48 may be fixed to the battery storage section 3.

[Towing Arrangement of Battery Unit]

Figure 11:
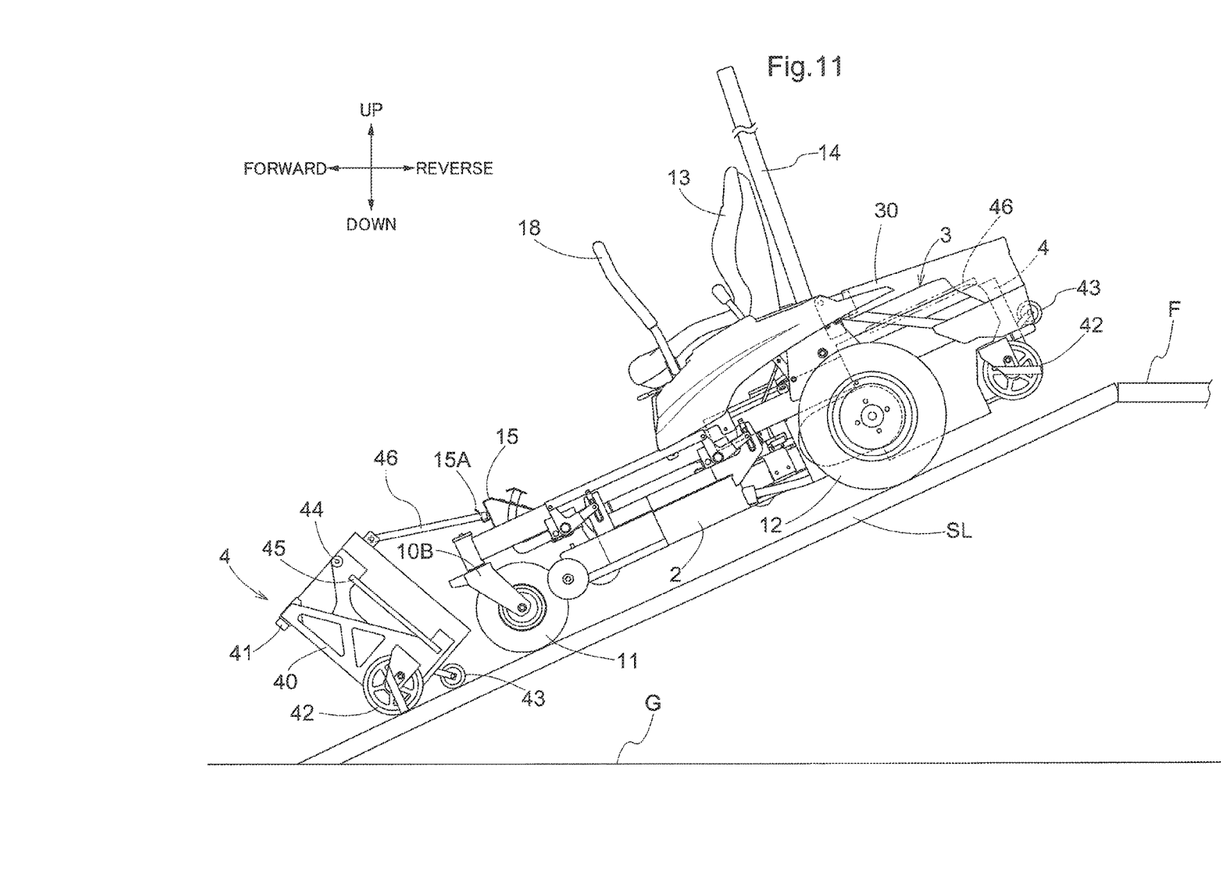
FIG. 11 is a side view showing a state in which the battery unit has been towed by the vehicle body.

As shown in FIG. 11, the free end side of the handle 46 and the vehicle body 1 can be connected to each other. With this connection, the battery unit 4 can be towed by the electric grass mower machine. A battery unit 4 which is located on more machine body front side than the electric work vehicle in FIG. 11 can be stored in the battery storage section 3 and this is a replacement battery unit 4 different from the battery unit 4 stored in the battery storage section 3.

In the embodiment shown in FIG. 11, the electric work vehicle is located on a slope SL between a load carrier deck F of a truck and the ground surface G, with the front portion of the vehicle body 1 being located on downstream side on the slope SL. And, the replacement battery unit 4 for replacement is located on more downstream side on the slope SL than the electric work vehicle.

The replacement battery unit 4 is disposed on the front side of the vehicle body 1, with the disposing side of the large-diameter leg wheels 42 being disposed on the rear side. Namely, in this case, the front/rear direction orientation of the replacement battery unit 4 will be same as the orientation in the case of it being stored in the battery storage section 3. Under this condition, the pair of left and right large-diameter leg wheels 42 and the small-diameter leg wheels 43 are placed in contact with the ground surface. With the portions of the replacement battery unit 4 on the disposing side of the large-diameter leg wheels 42 being located on the rear side, the portions of the replacement battery unit 4 on more front side than the large-diameter leg wheels 42 are tilted forwardly upwards. Also, in other words, with the portions of the replacement battery unit 4 on the disposing side of the large-diameter leg wheels 42 being located on the rear side, the portions of the battery unit 4 upwardly of the large-diameter leg wheels 42 are tilted rearwardly upwards.

A towing portion 15A is provided at a left/right center in the front portion of the floor plate 15. The towing portion 15A and the handle 46 are engageable with each other. When a worker or the like hooks the free end portion of the handle 46 to the towing portion 15A, the towing portion 15A can tow the battery unit 4 which has been removed from the battery storage section 3. As described above, when the pair of left and right large-diameter leg wheels 42 and the small-diameter leg wheels 43 are placed on the ground surface and the battery unit 4 is tilted, the pivotal based end portion of the handle 46 forms the upper end portion of the replacement battery unit 4. Further, under this tilted state of the replacement battery unit 4, the pivotal base end portion of the handle 46 is located higher than the towing portion 15A in the perpendicular direction (vertical direction) relative to the sloped surface of the slope SL. And, the worker or the like will pivot the handle 46 toward the disposing side of the vehicle body 1 and hook the free end portion of the handle 46 to the towing portion 15A. With this, connection between the electric grass mower machine and the replacement battery unit 4 is established, so that the electric grass mower machine can tow the replacement battery unit 4 on the slope SL.

In the electric grass mower machine in this embodiment, as seen in the side view, adjacent the front and rear portions of the pair of left and right rear wheels 12, there are disposed a pair of left and right traveling motors 16, a pair of left and right speed reduction mechanisms 17 and the battery unit 4. In particular, the weight of the battery unit 4 accounts for a large part of the total weight of the electric grass mower machine, and the ratio between the front half of the vehicle body 1 and the weight of the rear half of the vehicle body 1 is about "1:9", for example. Namely, the weight of the rear half of the vehicle body 1 accounts for about 90% of the total weight of the electric grass mower machine. In the instant embodiment, the battery storage section 3 is provided at a rear portion of the vehicle body 1, and the towing portion 15A is provided at a front portion of the vehicle body 1. When the replacement battery unit 4 is connected to the front side of the vehicle body 1, the ratio between the weight of the front half of the vehicle body 1 to which the replacement battery unit 4 is connected and the weight of the rear half of the vehicle body 1 becomes about "4:6" for example. Namely, with the arrangement of the replacement battery unit 4 being connected to the front side of the vehicle body 1, the front/rear weight balance of the vehicle body 1 will be in equilibrium, so that the electric grass mower machine can tow the replacement battery unit 4 without losing the front/rear balance. Further, as the towing portion 15A is located on more front side than the driver's seat 13, the driver or the like, as being seated at the driver's seat 13, can easily visually confirm the connection condition of the replacement battery unit 4.

On the slope SL, when the worker or the like operates the electric grass mower machine reversely, the replacement battery unit 4 is towed in association with this reverse driving of the electric grass mowing machine and the replacement battery unit 4 will be moved toward the load carrier deck F. Further, when the worker or the like operates the electric grass mower machine forwardly, in association with this forward driving of the electric grass mower machine, the replacement battery unit 4 will be pushed by the electric grass mower machine and will also be moved toward the ground surface G due to its own weight. With this, even when the load carrier deck F is not equipped with such a system as a tail gate lifter (not shown) for instance, unloading of the replacement battery unit 4 from the load carrier deck F can be easily made.

Other Embodiments

This invention is not limited to the arrangements and configurations illustrated in the foregoing embodiments. Next, some typical other embodiments of the present invention will be illustrated.

(1) In the foregoing embodiment, the guide rollers 44 of the battery unit 4 are capable of lifting (jacking) up the front portion of the vehicle body 1. However, the invention is not limited to this embodiment. For instance, the guide rollers 44 of the battery unit 4 may be configured to be capable of lifting (jacking) up the rear portion of the vehicle body 1. Namely, it will be sufficient if a lift-up member can lift up one end side of the vehicle body 1.

(2) In the foregoing embodiment, the battery storage section 3 is provided at a rear portion of the vehicle body 1. Instead, the battery storage section 3 may be provided at a front portion of the vehicle body 1. Or, it may be provided at the front/rear left/right center portion of the vehicle body 1.

(3) In the foregoing embodiment, the guide rollers 44 were employed as the "lift-up" member. However, the lift-up member need not necessarily be the guide rollers 44. Alternatively, a lift-up member separately from the guide rollers 44 may be provided in the battery unit 4.

(4) In the foregoing embodiment, the pair of left and right connecting stays 10C as an "engaging portion" were provided in the pair of left and right front wheel support portions 10B. However, the invention is not limited thereto. For instance, the pair of left and right connecting stays 10C may be provided directly in e.g. the beams 10A of the vehicle body 1. Further, the connecting stays 10C need not be provided as one left and right pair, but a single connecting stay 10C may be provided at the left/right center portion of the vehicle body 1. In correspondence therewith, the lift-up member can be provided at the left/right center portion at one front/rear end of the battery unit 4.

(5) In the foregoing embodiment, the tilted state of the battery unit 4 is maintained as the holder tool 48 extends in the front/rear direction to come into contact with the ground surface with the holder tool 48 being inserted in the through hole 47a. However, the invention is not limited to this embodiment. For instance, the small-diameter leg wheel 43 can be provided as a simple non-slip member, so that the large-diameter leg wheel 42 may be restrained by this non-slip member.

(6) In the foregoing embodiment, the electric work vehicle is self-propelled to tow the replacement battery unit 4. However, the invention is not limited thereto. For instance, the rear portion of the electric work vehicle may be connected via a winch of the load carrier deck of the truck, so that with the replacement battery unit 4 being hooked to the towing portion 15A, the electric work vehicle and the replacement battery unit 4 together may be towed by the winch.

(7) In the foregoing embodiment, the battery storage section 3 is provided at a rear portion of the vehicle body 1. Instead, the battery storage section 3 may be provided at a front portion of the vehicle body 1 or it may be provided at a front/rear left/right center portion of the vehicle body 1. Also, the towing portion 15A may be provided at a rear portion of the vehicle body 1. Namely, it may be arranged such that the battery unit 4 is pushed or towed by the electric work vehicle on the rear side of the vehicle body 1.

(8) In the foregoing embodiment, the towing portion 15A and the handle 46 are engageable with each other. Instead, it is also possible to arrange such that the towing portion 15A and the handle 46 are not engaged with each other. For instance, an engaging member separate from the handle 46 may be provided in the battery unit 4, so that with engagement between this engaging member and the towing portion 15A, the battery unit 4 may be pushed or towed by the electric work vehicle.

(9) The above-described electric work vehicle is not limited to an electric grass mower machine. The electric work vehicle may be e.g. an electric cleaning vehicle, an electric transporter vehicle, etc.

(10) In the foregoing embodiment, the large-diameter leg wheels 42 and the small-diameter leg wheels 43 may be turnable caster wheels supported to a swivel frame or non-turnable fixed caster wheels.

(11) In the foregoing embodiment, the stay 47 is disposed on more laterally outer side (the near side in the plane of FIG. 10) than the large-diameter leg wheel 42. However, the invention is not limited thereto. It will suffice for the stay 47 to be located in the periphery of the large-diameter leg wheel 42.

(12) In the foregoing embodiment, on the machine body inner sides of the pair of left and right respective front wheel support portions 10B, the pair of left and right connecting stays 10C and the recesses 10e are provided. However, the invention is not limited thereto. For instance, the pair of left and right connecting stays 10C and the recesses 10e may be provided at the front portions of the front wheel support portions 10B or at the machine body lateral outer side portions.

Incidentally, the configurations disclosed in the above-described embodiment (including the further embodiments, and the same hereinafter) can be applied in combination with the configurations disclosed in the other embodiment(s) as long as no contradiction results from such combination(s). The embodiments disclosed in the present specification are merely exemplary, and the embodiments of the present invention are not limited thereto, but can be modified appropriately without departing from the subject of the present invention.

The invention claimed is:

1. An electric work vehicle comprising:
   a vehicle body having traveling wheels;
   a traveling motor capable of driving the traveling wheels;
   a battery unit having, at one end portion thereof, a pair of left and right leg wheels, the battery unit being detachably attachable to a battery storage section of the vehicle body and being capable of supplying electric power to the traveling motor;
   a lift-up member provided at an area of the other end portion opposite to the side on which the leg wheels are located in the battery unit and capable of lifting up one end side of the vehicle body;
   wherein the battery unit, when detached from the battery storage section, is posture-switchable between a flat placement state in which the leg wheels and the other end portion thereof are placed in contact with the ground surface and a tilted posture in which the battery unit can stand on its own with the other end portion thereof being located higher than the leg wheels.

2. The electric work vehicle of claim 1, further comprising:
   a pair of left and right guide rails provided in left and right respective side walls of the battery storage section and extending in a front/rear direction and capable of guiding the battery unit to the battery storage section; and
   wherein the lift-up member comprises a pair of left and right guide rollers that can roll along the guide rails.

3. The electric work vehicle of claim 1, further comprising:
   a pair of left and right front wheels included in the traveling wheels and configured as caster type driven wheels;
   a pair of left and right front wheel support portions provided at front portions of the vehicle body and capable of pivoting the pair of left and right front wheels respectively along a vertically oriented axis; and
   engaging portions provided in the pair of left and right front wheel support portions and engageable with the lift-up member.

4. The electric work vehicle of claim 1, further comprising:
   a handle provided at an upper portion of the battery unit and capable of switching the posture of the battery unit between the flat placement state and the tilted state.

5. The electric work vehicle of claim 1, further comprising:
   stays provided in the battery unit and disposed in the periphery of the pair of left and right leg wheels, the stays allowing inserting of holder tools therethrough;
   wherein the battery unit is maintained under the tilted posture, with the holder tools being inserted in the stays.

6. An electric work vehicle comprising:
   a vehicle body having traveling wheels;
   a traveling motor capable of driving the traveling wheels;
   a battery unit having, at one end portion thereof, a pair of left and right leg wheels, the battery unit being detachably attachable to a battery storage section of the vehicle body and capable of supplying electric power to the traveling motor;
   a towing portion provided at the vehicle body and capable of towing the battery unit not attached to the battery storage section; and
   a handle provided at the battery unit and capable of towing the battery unit,
   wherein the towing portion and the handle are engageable with each other.

7. The electric work vehicle of claim 6, wherein:
   the battery storage section is provided at a rear portion of the vehicle body; and
   the towing portion is provided at a front portion of the vehicle body.

8. The electric work vehicle of claim 6,
   wherein the handle is provided at an upper portion of the battery unit.

9. An electric work vehicle comprising:
   a vehicle body having traveling wheels;
   a traveling motor capable of driving the traveling wheels;
   a battery unit having, at one end portion thereof, a pair of left and right leg wheels, the battery unit being detachably attachable to a battery storage section provided at a rear portion of the vehicle body and capable of supplying electric power to the traveling motor;
   a towing portion provided at a front portion of the vehicle body and capable of towing the battery unit not attached to the battery storage section; and
   a handle provided at an upper portion of the battery unit and capable of towing the battery unit,
   wherein the towing portion and the handle are engageable with each other.

10. An electric work vehicle comprising:
    a vehicle body having traveling wheels;
    a traveling motor capable of driving the traveling wheels;
    a battery unit having, at one end portion thereof, a pair of left and right leg wheels, the battery unit being detachably attachable to a battery storage section of the vehicle body and capable of supplying electric power to the traveling motor; and a towing portion capable of towing the battery unit not attached to the battery storage section,
wherein, during the towing of the battery unit, the pair of left and right leg wheels are in contact with a ground surface.

* * * * *